US009014443B2

(12) United States Patent
Marugame

(10) Patent No.: US 9,014,443 B2
(45) Date of Patent: Apr. 21, 2015

(54) IMAGE DIAGNOSTIC METHOD, IMAGE DIAGNOSTIC APPARATUS, AND IMAGE DIAGNOSTIC PROGRAM

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 81 days.

(21) Appl. No.: 13/520,490

(22) PCT Filed: Dec. 21, 2010

(86) PCT No.: PCT/JP2010/073014
§ 371 (c)(1),
(2), (4) Date: Jul. 3, 2012

(87) PCT Pub. No.: WO2011/081060
PCT Pub. Date: Jul. 7, 2011

(65) Prior Publication Data
US 2013/0011028 A1    Jan. 10, 2013

(30) Foreign Application Priority Data
Jan. 4, 2010  (JP) .................................. 2010-000149

(51) Int. Cl.
*G06K 9/00* (2006.01)
*G06T 3/40* (2006.01)

(52) U.S. Cl.
CPC ........................................ *G06T 3/40* (2013.01)

(58) Field of Classification Search
CPC ........... G06T 2207/30024; G06T 2207/10056; G06T 7/0012; G06T 7/0081; G06T 2207/30096; G06T 2207/30004; G06T 2210/41
See application file for complete search history.

(56) References Cited

U.S. PATENT DOCUMENTS 7,428,324 B2 *  9/2008  Crandall et al. ............... 382/128
2004/0202357 A1 * 10/2004  Perz et al. ..................... 382/128

(Continued)

FOREIGN PATENT DOCUMENTS

| CN | 1775171 A | 5/2006 |
| CN | 1988850 A | 6/2007 |

(Continued)

OTHER PUBLICATIONS

Würflinger et al.,"Robust automatic coregistration, segmentation, and classification of cell nuclei in multimodal cytopathological microscopic images", Jan. 2004, Computerized Medical Imaging and Graphics vol. 28, Issues 1-2, pp. 87-98.*

(Continued)

*Primary Examiner* — Vu Le
*Assistant Examiner* — Guillermo Rivera-Martinez
(74) *Attorney, Agent, or Firm* — Sughrue Mion, PLLC

(57) ABSTRACT

The image diagnostic apparatus includes: acquisition means 11 for acquiring data on an image having a first resolution, which is generated by imaging a diagnostic object; conversion means 12 for converting the resolution of the image into a second resolution which is lower than the first resolution; extraction means 13 for analyzing the image of which resolution has been converted into the second resolution and extracting an ROI of the diagnostic object; determination means 14 for determining whether or not a characteristic region which indicates a predetermined image characteristic exists in the ROI extracted by the extraction means 13; and creation means 15 for creating, when the characteristic region exists, an output image by converting the resolution so that the characteristic region is confined to an image size to be output, and occupies the image by a predetermined ratio or more.

5 Claims, 8 Drawing Sheets

(56) References Cited

U.S. PATENT DOCUMENTS

| | | | |
|---|---|---|---|
| 2006/0058624 A1* | 3/2006 | Kimura | 600/407 |
| 2006/0159325 A1 | 7/2006 | Zeineh et al. | |
| 2006/0159367 A1* | 7/2006 | Zeineh et al. | 382/276 |
| 2007/0031043 A1* | 2/2007 | Perz et al. | 382/225 |
| 2007/0135999 A1* | 6/2007 | Kolatt | 702/19 |
| 2008/0298658 A1 | 12/2008 | Nakashima et al. | |
| 2009/0141126 A1* | 6/2009 | Soenksen | 348/79 |
| 2009/0159814 A1* | 6/2009 | Maiya | 250/458.1 |
| 2009/0202124 A1* | 8/2009 | Matsuda et al. | 382/128 |

FOREIGN PATENT DOCUMENTS

| | | |
|---|---|---|
| EP | 2085019 B1 | 6/2013 |
| JP | 2005-10884 A | 1/2005 |
| JP | 2006-301965 A | 11/2006 |
| JP | 2008-93172 A | 4/2008 |
| JP | 2008-535528 A | 9/2008 |
| JP | 2009-9290 A | 1/2009 |
| JP | 2009-229203 A | 10/2009 |

OTHER PUBLICATIONS

Smereka et al., "Detection of Pathological Cells in Phase Contrast Cytological Images", 2006, Advanced Concepts for Intelligent Vision Systems Lecture Notes in Computer Science vol. 4179, pp. 821-832.*

Song et al., "A New Auto-focusing Algorithm for Optical Microscope Based Automated System", Dec. 2006, 9th International Conference on Control, Automation, Robotics and Vision, ICARCV 06, pp. 1-5.*

ChengEn et al., "An Efficient Image Segmentation Method with Application to Cell Images", Oct. 2008, 9th International Conference on Signal Processing, ICSP 08, pp. 1067-1070.*

Office Action dated Nov. 5, 2013 issued by the State Intellectual Property Office of the People's Republic of China in counterpart Chinese Patent Application No. 201080060594.5.

* cited by examiner

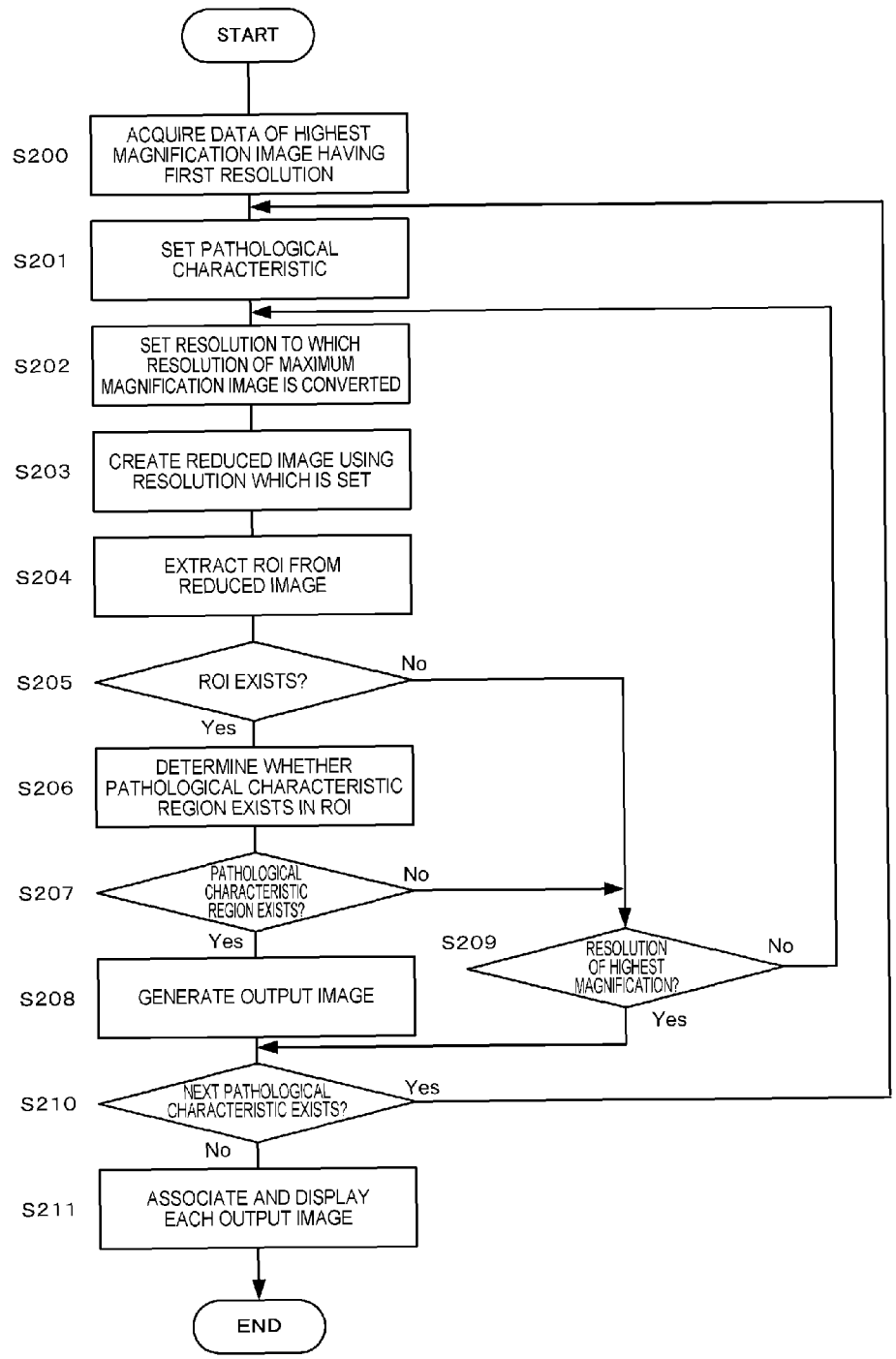

IMAGE DIAGNOSTIC METHOD, IMAGE DIAGNOSTIC APPARATUS, AND IMAGE DIAGNOSTIC PROGRAM

CROSS REFERENCE TO RELATED APPLICATIONS

This application is a National Stage of International Application No. PCT/JP2010/073014, filed on Dec. 21, 2010, which claims priority from Japanese Patent Application No. 2010-000149. filed on Jan. 4, 2010, the contents of all of which are incorporated herein by reference in their entirety.

BACKGROUND

The present invention relates to an image diagnostic method, an image diagnostic apparatus, and an image diagnostic program.

One example of a patient diagnostic method which has been used is a pathological diagnosis, where a sample of pathologically changed tissue and cells (a pathological sample) extracted from the body of a patient is attached to a glass slide, and is diagnosed using a microscope. The characteristics of the pathologically changed area observed in the pathological diagnosis include, for example, the characteristics which can be easily checked at low magnification, such as a gland, and the characteristics which can be checked at high magnification, such as an area inside a cell nucleus. In conventional pathological diagnosis using a microscope, the magnification of the microscope is set to low and a rough search of the sample is executed first, then the magnification is set higher in steps, and the specific region to be a reference of diagnosis (ROI) is narrowed down.

Recently pathological diagnosis using an image scanner (image diagnosis), which captures the image of the sample on a slide as an electronic image, is also performed in addition to pathological diagnosis using a microscope. In the case of the image diagnosis, an image is created at a magnification not greater than the magnification used for imaging, by downsampling from the electronic image (pathological image) on the entire side including the sample captured at high magnification.

In the image diagnosis, as described in Patent Document 1 below, it is common that the entire pathological image is divided into predetermined-sized blocks, and the ROI is analyzed in each block, and in multiple resolution analysis where the resolution of the image is changed in steps as well, [the entire area] is often divided into 4, 16 or into another integral multiple number. The size of the block to be the target of the image processing is normally limited by the processing capability of the hardware, such as the CPU and storage, and by the resolution of a display device, such as a monitor.

[Patent Document 1] Patent Publication JP-A-2009-009290

In the case of performing image diagnosis using the image obtained at a fixed magnification, however, a problem is that it is difficult to confine the area corresponding to pathological change in the pathological image within a practical image size at a magnification appropriate for diagnosis, if the above mentioned processing based on a predetermined block size is used. In other words, if the fixed magnification is lower than the magnification appropriate for diagnosis, the entire area corresponding to the pathological change in the pathological image cannot be confined to the image size or to a one block size in some cases. On the other hand, if the fixed magnification is higher than the magnification appropriate for diagnosis, the entire area corresponding to the pathological change in the pathological image cold be confined only to a small area within the image size or one block size.

SUMMARY

With the foregoing in view, it is an exemplary object of the present invention to solve the above problems and provide a new image diagnostic apparatus, image diagnostic method and image diagnostic program that can create an output image having a practical image size at a magnification which is appropriate for diagnosing a characteristic portion to be a reference of diagnosis.

An image diagnostic apparatus according to the exemplary aspect of the present invention comprises: acquisition means for acquiring data on an image having a first resolution, generated by imaging a diagnostic object; conversion means for converting the resolution of the image into a second resolution which is lower than the first resolution; extraction means for analyzing the image of which resolution has been converted into the second resolution and extracting an ROI of the diagnostic object; determination means for determining whether or not a characteristic region indicating a predetermined image characteristic exists in the ROI extracted by the extraction means; and creation means for creating, when the characteristic area exists, an output image by converting the resolution so that the characteristic region is confined to an image size to be output, and occupies the image by a predetermined ratio or more.

An image diagnostic method according to the exemplary aspect of the present invention comprises: an acquisition step of acquiring data on an image having a first resolution, generated by imaging a diagnostic object; a conversion step of converting the resolution of the image into a second resolution which is lower than the first resolution; an extraction step of analyzing the image of which resolution has been converted into the second resolution, and extracting an ROI of the diagnostic object; a determination step of determining whether or not a characteristic region indicating a predetermined image characteristic exists in the ROI extracted in the extraction step; and a creation step of creating, if the characteristic region exists, an output image by converting the resolution so that the characteristic region is confined to an image size to be output, and occupies the image by a predetermined ratio or more.

An image diagnostic method according to the exemplary aspect of the present invention comprising: a step of acquiring data on an image having a first resolution, generated by imaging a diagnostic object; a step of converting the resolution of the image into a second resolution which is lower than the first resolution; a step of analyzing the image of which resolution has been converted into the second resolution, and extracting an ROI of the diagnostic object; a step of determining whether or not a characteristic region indicating a predetermined image characteristic exists in the extracted ROI; and a step of creating, if the characteristic region exists, an output image by converting the resolution so that the characteristic region is confined to an image size to be output, and occupies the image by a predetermined ratio or more.

According to the of the present invention having the above mentioned configuration, an output image having a practical image size can be created at a magnification which is appropriate for diagnosing a characteristic portion to be a reference of diagnosis.

DESCRIPTION OF THE DRAWINGS

FIG. 8 is a flow chart depicting a processing content of the image diagnostic method according to the second embodiment.

EXEMPLARY EMBODIMENT

Preferred exemplary embodiments of the present invention will now be described with reference to the drawings. In each embodiment, a pathological sample extracted from a human body will be described as an example of the diagnostic object. The pathological sample is, for example, a sample prepared by slicing a block sample obtained by extracting an internal organ or a sample obtained by needle biopsy at a several micron thickness.

<First Embodiment>

Figure 1:
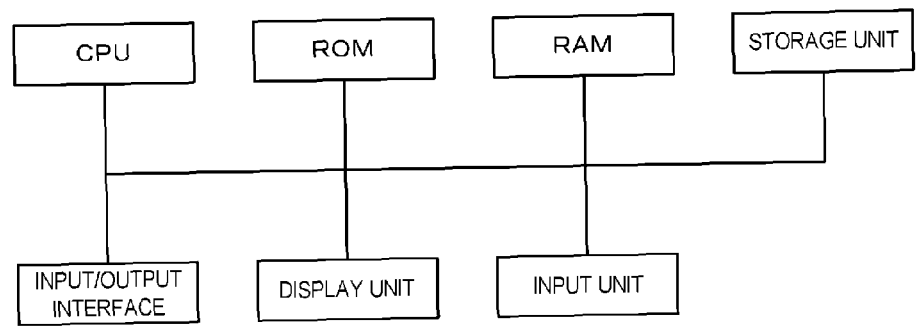
FIG. 1 is a block diagram depicting a hardware configuration of an image diagnostic apparatus 10 according to the first embodiment.
Figure 2:
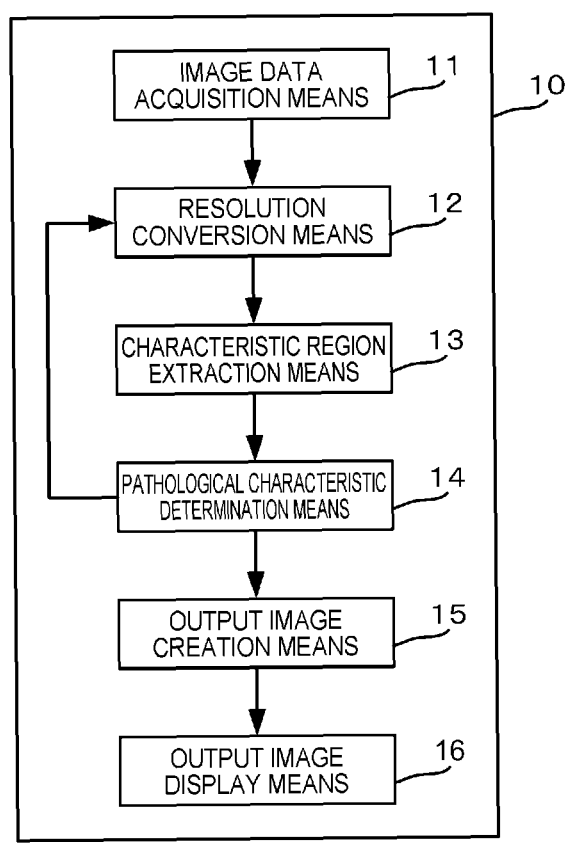
FIG. 2 is a diagram depicting an example of a general configuration of the image diagnostic apparatus 10 according to the first embodiment.

FIG. 1 is a block diagram depicting a hardware configuration of an image diagnostic apparatus 10 according to a first embodiment of the present invention, and FIG. 2 is a diagram depicting an example of a general configuration of the image diagnostic apparatus 10 according to the first embodiment of the present invention.

As FIG. 1 shows, the image diagnostic apparatus 10 as hardware comprises: a CPU (Central Processing Unit), and a ROM, a RAM, a storage unit, an input unit, a display unit, an input/output interface among others connected to the CPU via a bus, that is, similar hardware to a standard computer device. Physically the image diagnostic apparatus 10 may be either a dedicated system or a general purpose information processor. For example, using an information processor having a general configuration, the image diagnostic apparatus 10 may be implemented by starting up software, in which each processing of the image diagnostic method of the present invention is programmed.

As FIG. 2 shows, the image diagnostic apparatus 10 comprises: image data acquisition means 11; resolution conversion means 12, target region extraction means 13; pathological characteristic determination means 14; output image creation means 15 and output image display means 16. Each means is implemented primarily by the CPU executing programs stored in ROM and RAM, and controlling each hardware component.

The image data acquisition means (acquisition means) 11 acquires data on a highest magnification image (image) having a first resolution which is generated by imaging a pathological sample. The highest magnification image is, for example, an image generated by attaching a dyed pathological sample onto a slide, and imaging the entire slide at the highest magnification using an image scanner, and [this image] can be obtained from the image scanner. The first resolution is a resolution corresponding to the highest magnification of the image scanner.

The resolution conversion means (conversion means) 12 converts the resolution of the image into a resolution lower than the first resolution. In other words, a reduced image, created with a lower resolution from the highest magnification image by converting the resolution, is generated by digital signal processing. In concrete terms, the resolution conversion means 12 converts a resolution of an image into a second resolution, which is lower than the first resolution. The second resolution is a resolution corresponding to an initial magnification that is specified in the beginning when the ROI of the pathological sample is extracted by the target region extraction means 13, which is described later, and can be set according to the pathological change [to be detected in the sample]. It is preferable that the initial magnification is set, for example, to a magnification that is slightly lower than the low magnification which is set for microscopic observation when the pathological diagnosis is performed using a microscope. The resolution conversion means 12 also converts the resolution of the image into a third resolution, which is the first resolution or less and higher than the second resolution, and sets this resolution according to the size of the pathological characteristic area.

Figure 3:
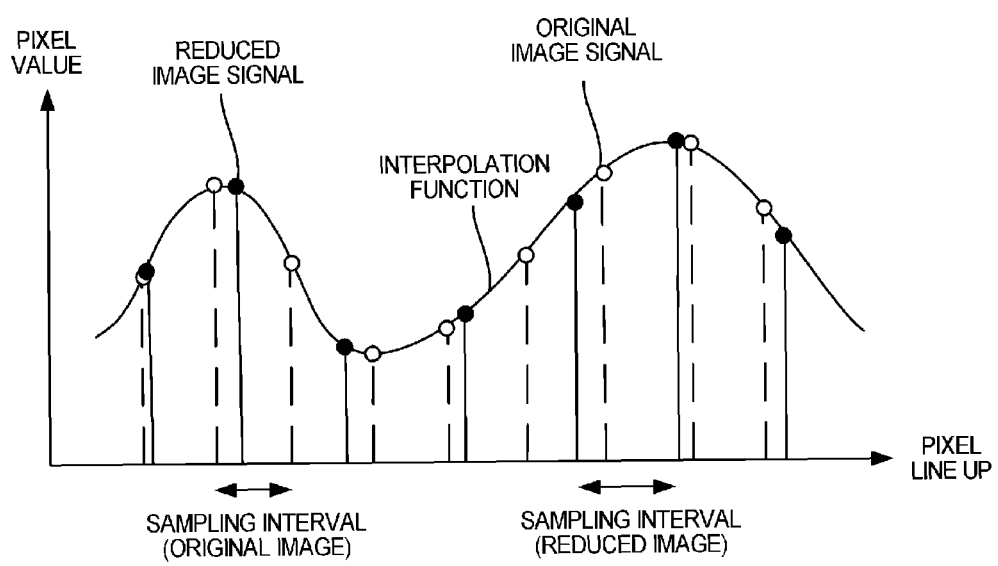
FIG. 3 is a diagram depicting the down sampling of image signals using an interpolation function.

Here the method for converting the first resolution into the second resolution (reduction image generation method) can be implemented, for example, by determining an average value or a central value at a predetermined interval in the image with the first resolution, if the second resolution is 1/integer of the first resolution. If a reduced image at an arbitrary magnification is created, the reduced image can be generated by down-sampling, which is used for the signal processing technology. In down-sampling, as shown in FIG. 3 for example, a value between the sampling signals of the original image (high magnification image) is modeled by an interpolation function (e,g. B-spline function, Lanczos function), so that a necessary value is provided at an interval used for the reduced image. For the resolution conversion method, various general methods which have been known, including the above mentioned method, can be used.

The target region extraction means (extraction means) 13 analyzes an image of which resolution was converted into the second resolution (reduced image), and extracts a region of interest (ROI) of the pathological sample. For example, if the cell nucleuses of cancer cells are characteristics of the pathological change to be a reference of diagnosis of the pathological sample (pathological characteristics), a region where it is suspected that the cell nucleuses exist at high density can be extracted as the region of interest, since cancer cells often grow at higher density compared to normal cells. If the pathological sample is dyed with hematoxylin-eosin (HE), a portion of the cell nucleus becomes violet, and a portion of cytoplasm becomes reddish purple. So the portion where the density of violet pixels is high in the image, that is a region in which a number of violet pixels in a unit area is a predetermined value or more, can be extracted as an ROI. For the ROI extraction method, techniques of conventional ROI determination methods, including the above mentioned method, can be used.

The pathological characteristic determination means (determination means) 14 determines whether a characteristic region (pathological characteristic region) that indicates a predetermined image characteristic exists in the extracted ROI. Whether or not a pathological characteristic region exists can be determined depending on whether a pathological characteristic, of which color and shape correspond to those of the predetermined pathological characteristic, can be detected from the ROI. For example, an identification unit, which has learned the color, shape or the like of the pathological characteristics as characteristic quantity vectors using such a mechanical learning system as a neural network and a support vector machine, may be used. For the pathological characteristic determination method, conventional pathological characteristic determination methods, including the above mentioned method, can be used.

If a pathological characteristic region is detected, the pathological characteristic determination means 14 transmits the magnification of the reduced image, the size and positional information of the pathological characteristic in the reduced image, and the converted values thereof in the highest magnification image to the output image creation means 15. If a pathological characteristic region is not detected, the pathological characteristic determination means 14 transmits the instruction information to the resolution conversion means 12, so as to convert the resolution of the image into a third resolution which is the first resolution or less and higher than the second resolution. As a result, in the reduced image displayed with the new resolution converted by the resolution conversion means 12, the target region extraction means 13 and the pathological characteristic determination means 14 extracts an ROI again, and determines whether a pathological characteristic region exists. In the second or later ROI extraction, the information set for the previous resolution may be used to conserve the processing time. The resolution conversion means 12, the target region extraction means 13 and the pathological characteristic determination means 14 execute the respective processing until a pathological characteristic is detected or until the resolution reaches the first resolution (highest magnification). If a pathological characteristic region is not detected even at the highest magnification, pathological characteristic region absent information is transmitted to the output image creation means 15.

If a pathological characteristic region exists, the output image creation means (creation means) 15 calculates an appropriate magnification in the pathological characteristic region, and based on this magnification and a position corresponding to [the pathological characteristic region] in the highest magnification image, the output image creation means 15 creates an output image by converting the resolution, so that the area corresponding to the pathological characteristic region in the highest magnification image is confined to a predetermined range in the output image size. In other words, if the information on the resolution (magnification) of the reduced image, the information on size and position of the pathological characteristic in the reduced image, and the information on the conversion value in the highest magnification image are received, the output image creation means 15 creates, based on this information, an output image having a size which is predetermined according to the processing capability of the hardware, including the CPU and storage. At this time the resolution of the output image is adjusted so that the pathological characteristic region is confined to the size of the output image, and also occupies the output image by a predetermined ratio or more. For example, it is assumed that the resolution is adjusted so that the size of the output image is 2048×2048 pixels, and the pathological characteristic region occupies the output image by 50%. In this case, a resolution of the output image can be calculated by P×x, where P is (2097152/A), that is a ratio of the total number of pixels in the pathological characteristic region in the reduced image (denoted by A) and the output image size, and x denotes a magnification of the reduced image. The ratio of the pathological characteristic region in the output image is not limited to the above mentioned 50%, but a value less than 100% may be freely set according to the pathological characteristic.

Figure 4:
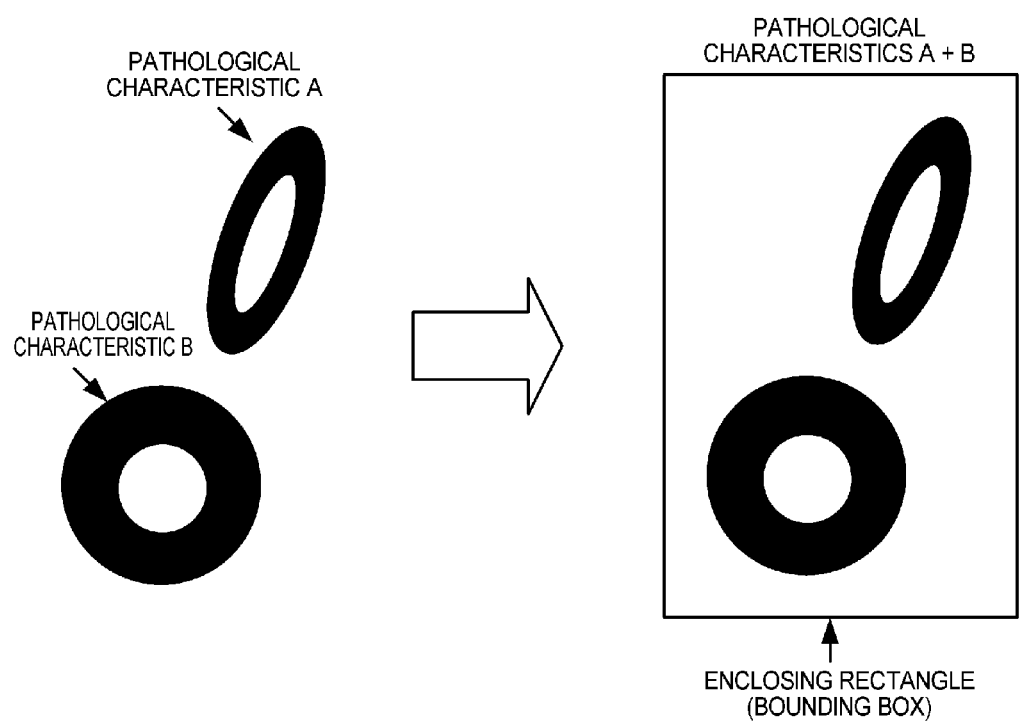
FIG. 4 is a diagram depicting how to create an enclosing rectangle of adjacent pathological characteristics.

After calculating the resolution, the output image creation means 15 converts the highest magnification image into a reduced image using the calculated resolution, then generates an output image by extracting the corresponding pathological characteristic region in the reduced image based on the positional information on the pathological characteristic region. In the case of an aspect ratio being too large or too small, a minimum aspect ratio may be set, such as 50% or more in the vertical direction, and 50% or more in the horizontal direction. If the pathological characteristic regions at a same magnification are close to (adjacent to) each other within a predetermined distance, as shown in FIG. 4 for example, an enclosing rectangle (boundary box), which encloses the pathological characteristic regions close to each other, may be created, so that the above mentioned output image is generated regarding the enclosing rectangle as one pathological characteristic region.

The output image display means 16 is, for example, a monitor that displays the created output image. If a pathological characteristic region does not exist, that is if the pathological characteristic region absent information is received, the display means 16 may display, for example, the message "pathological characteristic was not found" on the display unit, or may continuously display nothing.

Figure 5:
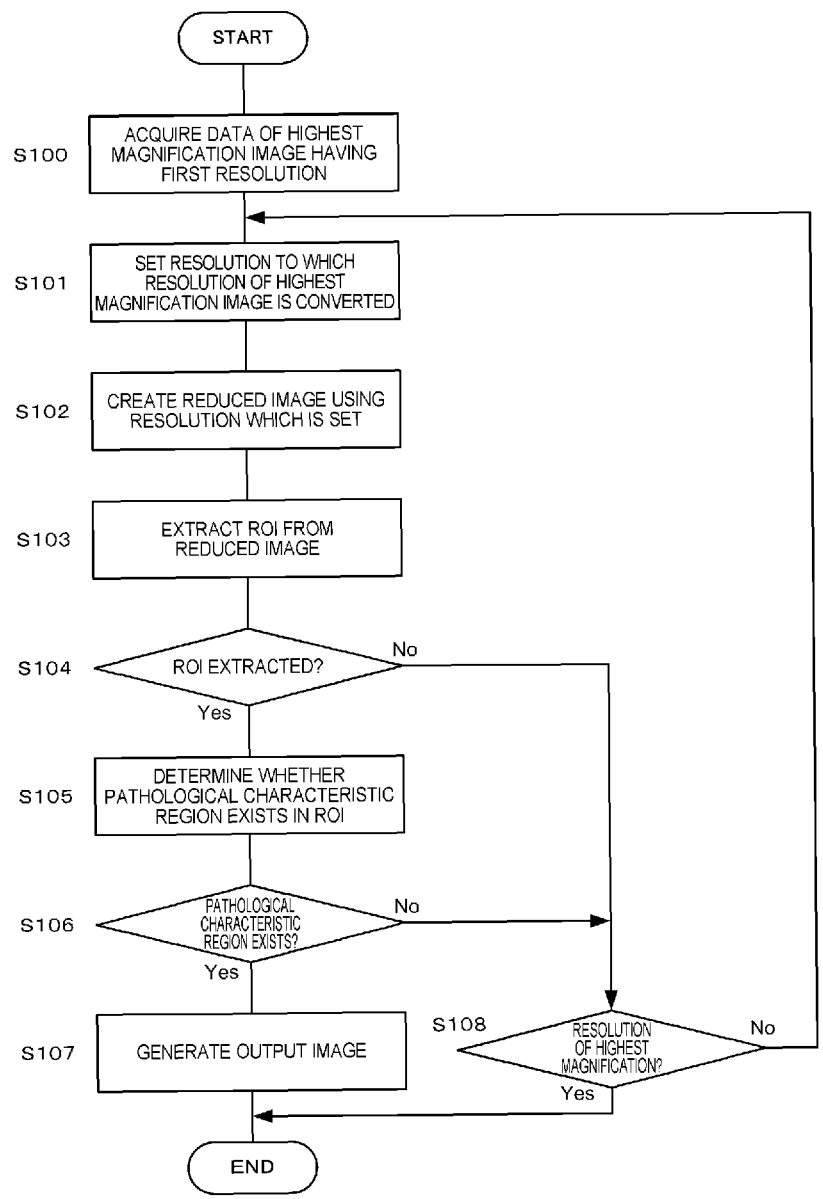
FIG. 5 is a flow chart depicting a processing content of the image diagnostic method according to the first embodiment.

Now an image diagnostic method according to the present embodiment, that is performed in the image diagnostic apparatus 10, will be described with reference to the flow chart shown in FIG. 5. Each processing shown in the flow chart in FIG. 5 may be executed in an arbitrary sequence or in parallel within the scope of not creating any inconsistencies in the processing contents, First the image data acquisition means 11 acquires data on a highest magnification image having a first resolution (step S100). The highest magnification image is, for example, an image generated by attaching a dyed pathological sample onto a slide, and imaging the entire slide at the highest magnification using an image scanner.

Then the resolution conversion means 12 sets a resolution of which the resolution of the highest magnification image is converted (step S101). For the initial setting, a second resolution which is lower than the first resolution is set. The second resolution is a resolution that corresponds to an initial magnification which is specified first when a characteristic region of a pathological sample is extracted.

Then using digital signal processing, the resolution conversion means 12 creates a reduced image created with a lower resolution, out of the highest magnification image, by converting the resolution (step S102). As mentioned above, various methods can be used for generating the reduced image, such as down-sampling.

Then the target region extraction means 13 analyzes the reduced image of which resolution was converted, and extracts an ROI of the pathological sample (step S103). For example, if the cell nucleuses of cancer cells are characteristics to be a reference of diagnosis of the pathological sample (pathological characteristics), a region where it is suspected that the cell nucleuses exist at high density can be extracted as a region of interest (ROI), since cancer cells often grow at a higher density compared with normal cells.

If an ROI is extracted (step S104: YES), the pathological characteristic determination means 14 determines whether or not a pathological characteristic region exists in the ROI (step S105). Whether or not a pathological characteristic region exists can be determined depending on whether a characteristic corresponding to the color and shape of the pathological characteristic is extracted from the ROI.

If a pathological characteristic region exists (step S106: YES), the output image creation means 15 creates an output image by converting the resolution so that the pathological characteristic region, out of the highest magnification image, is confined to the size of the output image, and occupies the image by a predetermined ratio or more (step S107). As mentioned above, the output image is generated when a pathological characteristic region exists, based on the magnification of the reduced image, size and position information of the pathological characteristic in a reduced image, and the converted values thereof in the highest magnification image, which are transmitted from the pathological characteristic determination means 14. The created output image is displayed by the display means 16, and a physician can perform image diagnosis by performing image processing on the display image as necessary.

If an ROI is not extracted (step S104: NO) or if a pathological characteristic region does not exist (step S106: NO), it is determined whether the currently set resolution is the resolution corresponding to the highest magnification (first resolution) (step S108).

If the currently set resolution is the resolution corresponding to the highest magnification (step S108: YES), this processing flow ends. If the currently set resolution is not the resolution corresponding to the highest magnification (step S108: NO), processing returns to step S101, and the resolution conversion means 12 increases the currently set resolution by a predetermined ratio, sets this resolution as the resolution used for converting the highest magnification image, and repeats the processing in steps S101 to S108.

An image diagnostic program according to the present embodiment can be provided by constructing the image diagnostic method according to the first embodiment as a program that can be executed on a computer, storing the program in an information storage media (memory) that can be freely read by the computer, and executing the processing shown in the above mentioned processing flow on the computer.

According to the present embodiment, an output image having a practical image size can be created at a magnification which is appropriate for diagnosing a characteristic portion to be a reference of diagnosis. For example, in the pathological diagnosis of cancer, the pathological characteristics to be a reference of diagnosis can be clearly displayed at various magnifications which are different from the magnification of the lens.

Further, a pathological characteristic can be confined to an image having a practical image size at a magnification appropriate for diagnosis, by repeating the ROI extraction processing on the pathological image, and creating a reduced image by down-sampling processing performed on the image.

Furthermore, when a computerized pathological image is used for diagnosis, a most visible pathological characteristic can be displayed within an image size, which is limited by the processing capability of the hardware, such as the CPU and storage, and by the resolution of a display device, such as a monitor.

By saving electronic data corresponding to a magnification and an image size with which the pathological image characteristic can be displayed clearly, training materials for pathological image diagnosis can be accumulated.

<Second Embodiment>

An image diagnostic apparatus 20 according to a second embodiment of the present invention will now be described.

According to the second embodiment, an output image is created at an appropriate magnification for a plurality of pathological characteristics, and these output images are associated and output. In the present embodiment, a case of having two pathological characteristics (first pathological characteristic and second pathological characteristic) that can be checked at different magnifications will be described as an example, but the present invention is not limited to this case, and may have three or more pathological characteristics, for example.

Figure 6:
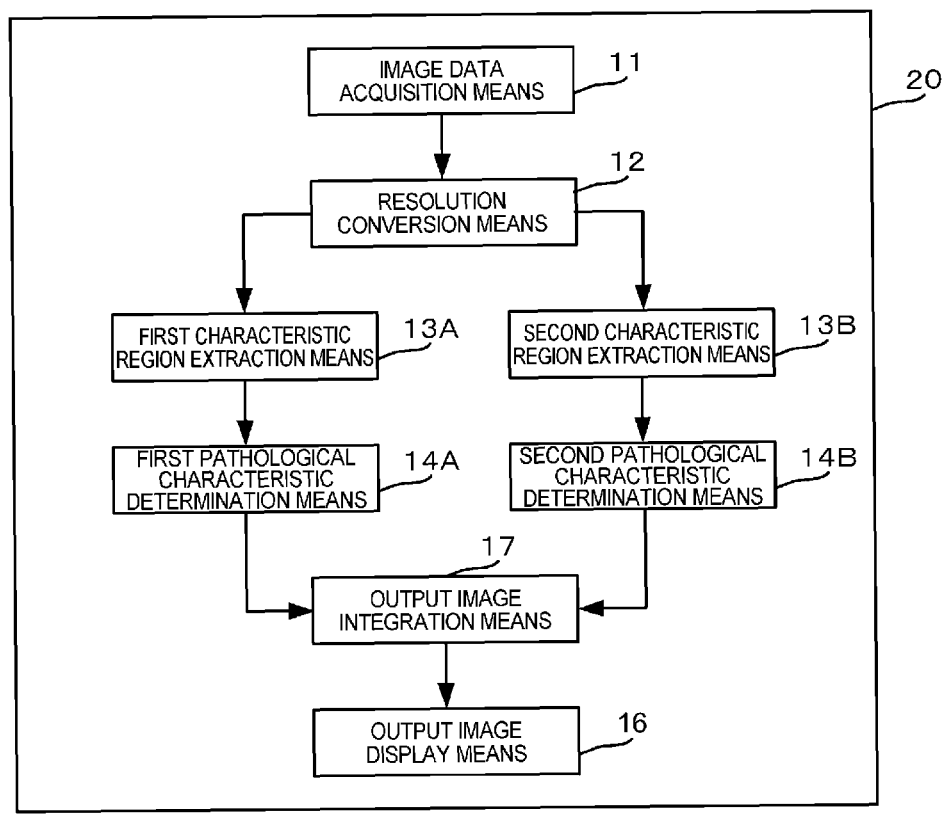
FIG. 6 is a diagram depicting an example of a general configuration of the image diagnostic apparatus 10 according to the second embodiment.

FIG. 6 is a diagram depicting an example of a general configuration of the image diagnostic apparatus 20 according to the second embodiment of the present invention.

As FIG. 6 shows, the image diagnostic apparatus 20 comprises: image data acquisition means 11; resolution conversion means 12; first target region extraction means 13A; second target region extraction means 13B; first pathological characteristic determination means 14A; second pathological characteristic determination means 14B; output image display means 16; and output image integration means 17. Each means is implemented primarily by the CPU executing programs stored in ROM and RAM, controlling each hardware component. For each means that is primarily common with each means of the first embodiment, detailed description is omitted.

The first target region extraction means 13A analyzes an image of which resolution was converted into the second resolution (reduced image), and extracts an ROI of a first pathological characteristic, and the second target region extraction means 13B analyzes an image of which resolution was converted into the second resolution (reduced imaged), and extracts an ROI of a second pathological characteristic. Detailed description of the functions of the first target region extraction means 13A and the second target region extraction means 13B, which are common with the functions of the target region extraction means 13 of the first embodiment, is omitted here.

The first pathological characteristic determination means 14A determines whether or not the first pathological characteristic exists in the extracted ROI, and the first pathological characteristic determination means 14B determines whether or not the second pathological characteristic exists in the extracted ROI. Detailed description on the functions of the first pathological characteristic determination means 14A and the second pathological characteristic determination means 14B, which are common with the functions of the pathological characteristic determination means 14 of the first embodiment, is omitted here.

The output image integration means 17 has a function to associate the output images created for each pathological characteristic, in addition to the function of the output image creation means 15 of the first embodiment. For example, if a region of the first pathological characteristic and a region of the second pathological characteristic are in a same position at different magnifications, then [the output image integration means 17] associates these output images, integrates them, and allows the display means 16 to display the created output image. A possible method for association is displaying mutual image information on the image header of each output image, or arranging and displaying [each output image] on a WEB page. In the case of disposing [each output image] on a WEB page, the information link shown in FIG. 7, for example, may be set.

Now an image diagnostic method according to the present embodiment, that is performed in the image diagnostic apparatus 20, will be described with reference to the flow chart shown in FIG. 8. The present embodiment will be described using two pathological characteristics (first pathological characteristic having a characteristic in a gland structure, and second pathological characteristic having a characteristic in a cell nucleus structure) which can be checked at different magnifications. Each processing shown in the flow chart in FIG. 8 may be executed in an arbitrary sequence or in parallel within the scope of not creating any inconsistencies in the processing contents.

First the image data acquisition means 11 acquires data on a highest magnification image having a first resolution (step S200).

Then a pathological characteristic of which an output image is generated is set (step S201). For example, a first pathological characteristic is set, assuming that an output image of the first pathological characteristic having a characteristic in the gland structure is generated first.

Then each processing in steps S202 to S209 is executed. Detailed description on each processing in steps S202 to S209, which is the same as each processing in steps S101 to S108 of the first embodiment, is omitted here.

After the processing in step S208 or the processing in step S209, it is determined whether or not a next pathological characteristic exists (step S210).

If a next pathological characteristic exists (step S210: YES), processing returns to step S201, and a second pathological characteristic, which is the next pathological characteristic, is set, assuming that an output image of the second pathological characteristic having a characteristic in the cell nucleus structure is generated next, and the processings in steps S202 to S209 are repeated.

Figure 7:
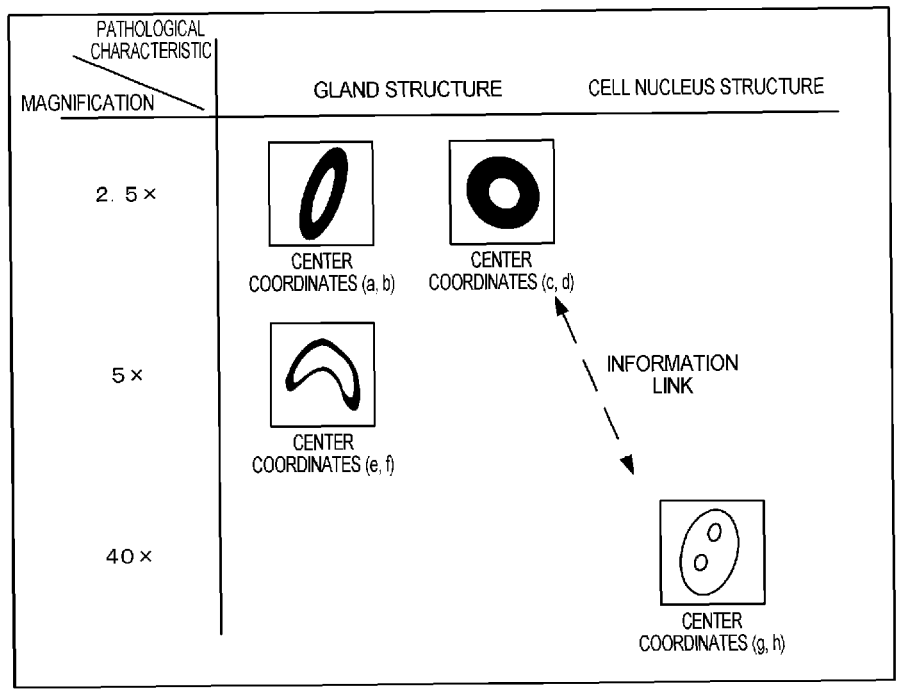
FIG. 7 is a diagram depicting an example of arranging and displaying different pathological characteristics at different magnifications on a WEB page.

If the next pathological characteristic does not exist (step S210: NO), the output image integration means 16 associates and displays the output image created for each pathological characteristic (step S211). For example, if the first pathological characteristic and the second pathological characteristic are in a same position at different magnifications, then [the output image integration means 16] associates these output images, and integrates and displays the images as shown in FIG. 7.

An image diagnostic program according to the present embodiment can be provided by constructing the image diagnostic method according to the second embodiment as a program that can be executed on a computer, storing the program in an information storage media (memory) that can be freely read by the computer, and executing the processing shown in the above mentioned processing flow on the computer.

According to the present embodiment, an output image having a practical image size can be created for each pathological characteristic at a magnification which is appropriate for diagnosing a pathological characteristic region respectively. Furthermore, different pathological characteristics are associated and displayed, whereby useful information can be provided to a physician who performs pathological diagnosis, and efficiency of the diagnosis can be improved.

<Modifications>

Although preferred embodiments of the present invention were described, the present invention is not limited to the embodiments, and numerous modifications, additions and omissions can be made by those skilled in the art without departing from the spirit and scope expressed in the Claims.

For example, in each of the above embodiments, a case of displaying the output image on the display unit, such as a monitor, was described as an exemple, but the present invention is not limited to this case, and the output image may be printed using a printing device, such as a printer, connected to the image diagnostic apparatus 10 or 20.

Each of the above embodiments was described using a pathological sample as an example of the diagnostic object, but the present invention is not limited to this case, and another biological sample may be used.

In each of the embodiments, the image diagnostic apparatus 10 or 20 has each means according to the applications, but some of the means of the image diagnostic apparatus 10 or 20 may be integrated, or one means thereof may be divided into a plurality of means.

This application claims priority from Japanese Patent Application No. 2010-149, filed on Jan. 4, 2010, and the entire disclosure thereof is incorporated here.

Although the present invention has been described with reference to the embodiments, the present invention is not limited to the embodiments. Numerous modifications can be made on the configuration and details of the present invention by those skilled in the art within the scope of the present invention.

The present invention can be used to support diagnosis based on a pathological image.

10, 20 image diagnostic apparatus
11 image data acquisition means
12 resolution conversion means
13 target region extraction means
14 pathological characteristic determination means
15 output image creation means
16 output image display means

I claim:

1. An image diagnostic apparatus, comprising:
    an acquisition unit configured to acquire data of an image having a first resolution, the data generated by imaging a pathological diagnostic object;
    a conversion unit configured to convert the resolution of the image into a second resolution which is lower than the first resolution;
    an extraction unit configured to analyze the image of which resolution has been converted into the second resolution and to extract a region of interest (ROI) of the pathological diagnostic object;
    a determination unit configured to determine whether or not a characteristic region indicating a predetermined image characteristic to be a reference of pathological diagnosis exists in the ROI extracted by the extraction unit, when the ROI is extracted by the extraction unit; and
    a creation unit configured to create, when the characteristic region exists, an output image by converting the resolution so that a ratio of an area of the characteristic region in the output image to an area of the output image is at least a predetermined ratio and less than 100%, wherein
    when the ROI is not extracted from the image of which resolution has been converted into the second resolution by the extraction unit,
        the conversion unit is further configured to convert the resolution of the image into a third resolution which is less than or equal to the first resolution and higher than the second resolution, and
        the extraction unit is further configured to analyze the image converted into the third resolution, and to extract the ROI of the diagnostic object.

2. The image diagnostic apparatus according to claim 1, wherein the creation unit is further configured to create an output image for each of a plurality of the predetermined image characteristics,
    the image diagnostic apparatus further comprising a display unit configured to associate each output image of different image characteristics when the different image characteristics exist in a same position in the image and to display the associated output images.

3. The image diagnostic apparatus according to claim 1, wherein the diagnostic object is a pathological sample.

4. An image diagnostic method, comprising:
acquiring data of an image having a first resolution, the data generated by imaging a pathological diagnostic object;
converting the resolution of the image into a second resolution which is lower than the first resolution;
analyzing the image of which resolution has been converted into the second resolution, and extracting a region of interest (ROI) of the pathological diagnostic object;
determining whether or not a characteristic region indicating a predetermined image characteristic to be a reference of pathological diagnosis exists in the ROI extracted in the extraction step; and
creating, when the characteristic region exists, an output image by converting the resolution so that a ratio of an area of the characteristic region in the output image to an area of the output image is at least a predetermined ratio and less than 100%, wherein
when the ROI is not extracted from the image of which resolution has been converted into the second resolution in the extraction step, the method further comprises
converting the resolution of the image into a third resolution which is the first resolution or less and higher than the second resolution, and
analyzing the image converted into the third resolution, and extracting the ROI of the diagnostic object.

5. A non-transitory computer readable medium, having stored therein an image diagnostic program that, when executed by a computer, performs a method comprising:
acquiring data of an image having a first resolution, the data generated by imaging a pathological diagnostic object;
converting the resolution of the image into a second resolution which is lower than the first resolution;
analyzing the image of which resolution has been converted into the second resolution, and extracting a region of interest (ROI) of the pathological diagnostic object;
determining whether or not a characteristic region indicating a predetermined image characteristic to be a reference of pathological diagnosis exists in the extracted ROI; and
creating, when the characteristic region exists, an output image by converting the resolution so that the ratio of an area of the characteristic region in the output image to an area of the output image is at least a predetermined ratio and less than 100%, wherein
when the ROI is not extracted from the image of which resolution has been converted into the second resolution by the extracting, the method further comprises
converting the resolution of the image into a third resolution which is the first resolution or less and higher than the second resolution, and
analyzing the image converted into the third resolution, and extracting the ROI of the diagnostic object.

* * * * *